United States Patent
Fujiyama

(10) Patent No.: US 11,955,293 B2
(45) Date of Patent: Apr. 9, 2024

(54) POWER STORAGE DEVICE, POWER SUPPLY DEVICE, MOVING BODY, CAPACITOR, AND METHOD FOR PROTECTING POWER STORAGE DEVICE

(71) Applicant: Panasonic Intellectual Property Management Co., Ltd., Osaka (JP)

(72) Inventor: Terumi Fujiyama, Yamaguchi (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 623 days.

(21) Appl. No.: 17/120,034

(22) Filed: Dec. 11, 2020

(65) Prior Publication Data
US 2021/0098198 A1 Apr. 1, 2021

Related U.S. Application Data

(63) Continuation of application No. PCT/JP2019/024945, filed on Jun. 24, 2019.

(30) Foreign Application Priority Data

Jun. 28, 2018 (JP) ................................. 2018-123637

(51) Int. Cl.
*H01G 9/00* (2006.01)
*H01G 9/14* (2006.01)
*H01G 9/145* (2006.01)

(52) U.S. Cl.
CPC ............. *H01G 9/0003* (2013.01); *H01G 9/14* (2013.01); *H01G 9/145* (2013.01)

(58) Field of Classification Search
CPC ........ H01G 9/0003; H01G 9/14; H01G 9/145; H01G 11/10; H01G 11/08; H01G 11/16;
(Continued)

(56) References Cited

U.S. PATENT DOCUMENTS 5,019,457 A * 5/1991 Nishio ................. H01H 85/046
428/606
5,087,999 A * 2/1992 Sato ......................... H01G 4/40
361/17
(Continued)

FOREIGN PATENT DOCUMENTS

CN 2917062 Y * 6/2007
CN 201320968 Y * 10/2009
(Continued)

OTHER PUBLICATIONS

Su, Shi-wei; A vehicle power supply voltage stabilizer; Filing date: Apr. 24, 2006; Specification and Drawings (Year: 2007).*
(Continued)

*Primary Examiner* — Dharti H Patel
(74) *Attorney, Agent, or Firm* — Rimon P.C.

(57) ABSTRACT

A power storage device includes a plurality of power storage units and a plurality of disconnection units. The plurality of power storage units are electrically connected in parallel between a pair of connection points. The plurality of disconnection units each connect to a corresponding power storage unit in the plurality of power storage units. Each of the plurality of disconnection units is configured to electrically disconnect between the corresponding power storage unit and at least one of the pair of connection points in accordance with flowing of a current at a value more than or equal to a predetermined value in the corresponding power storage unit.

10 Claims, 5 Drawing Sheets

(58) Field of Classification Search
CPC . H01G 9/26; H01G 2/16; Y02T 10/70; H02H 7/18; H02J 7/02; H02J 7/00; B60L 3/00; B60L 58/10
See application file for complete search history.

(56) References Cited

U.S. PATENT DOCUMENTS

| | | | | |
|---|---|---|---|---|
| 5,363,272 | A | 11/1994 | Tanaka et al. | |
| 5,841,334 | A * | 11/1998 | East | H03J 5/246 361/275.2 |
| 5,936,474 | A * | 8/1999 | Rousselin | H03L 7/099 331/34 |
| 2006/0267721 | A1* | 11/2006 | Graf | H01C 7/126 337/297 |
| 2006/0267722 | A1* | 11/2006 | Graf | H05K 1/0293 257/E23.149 |
| 2006/0268645 | A1* | 11/2006 | Graf | H01H 69/02 365/225.7 |
| 2010/0246099 | A1 | 9/2010 | Naka et al. | |
| 2012/0250203 | A1* | 10/2012 | Makihara | G01R 31/3835 324/750.01 |
| 2014/0299579 | A1* | 10/2014 | Hartmann | H01H 33/596 361/93.1 |

FOREIGN PATENT DOCUMENTS

| | | | | |
|---|---|---|---|---|
| CN | 204065118 U | * | 12/2014 | |
| CN | 204605708 U | * | 9/2015 | |
| CN | 205232070 U | * | 5/2016 | |
| CN | 205283144 U | * | 6/2016 | |
| CN | 205335936 U | * | 6/2016 | |
| CN | 206498563 U | * | 9/2017 | |
| CN | 215343916 U | * | 12/2021 | |
| FR | 2957423 A1 | * | 9/2011 | .......... G01R 31/028 |
| JP | 58-010812 | | 1/1983 | |
| JP | 59-020661 U | | 2/1984 | |
| JP | 62-244121 | | 10/1987 | |
| JP | 1-196190 | | 8/1989 | |
| JP | 7-057977 | | 3/1995 | |
| JP | 8-294283 | | 11/1996 | |
| JP | 2002-094348 | | 3/2002 | |
| JP | 2005-130441 | | 5/2005 | |
| JP | 2005-243926 | | 9/2005 | |
| JP | 2007-043880 | | 2/2007 | |
| JP | 2010-092910 | | 4/2010 | |
| JP | 2010-251716 | | 11/2010 | |
| JP | 2015-130441 A | | 7/2015 | |
| WO | WO-9220082 A1 | * | 11/1992 | ............... H01G 2/14 |
| WO | WO-2017036499 A1 | * | 3/2017 | ............. H01G 11/10 |

OTHER PUBLICATIONS

English Translation of Chinese Office Action dated Dec. 22, 2021 for the related Chinese Patent Application No. 201980042327.6.
International Search Report of PCT application No. PCT/JP2019/024945 dated Sep. 3, 2019.

* cited by examiner

POWER STORAGE DEVICE, POWER SUPPLY DEVICE, MOVING BODY, CAPACITOR, AND METHOD FOR PROTECTING POWER STORAGE DEVICE

RELATED APPLICATIONS

This application is a continuation of the PCT International Application No. PCT/JP2019/024945 filed on Jun. 24, 2019, which claims the benefit of foreign priority of Japanese patent application No. 2018-123637 filed on Jun. 28, 2018, the contents all of which are incorporated herein by reference.

BACKGROUND

1. Technical Field

The present disclosure generally relates to a power storage device, a power supply device, a moving body, a capacitor, and a method for protecting a power storage device. More specifically, the present disclosure relates to a power storage device including a plurality of power storage units electrically connected in parallel, a power supply device, a moving body, a capacitor, and a method for protecting a power storage device.

2. Description of the Related Art

Unexamined Japanese Patent Publication No. 2007-43880 describes a power storage device (capacitor pack) including a plurality of power storage units (capacitors). This power storage device is for increasing a capacitance by electrically connecting the plurality of power storage units in parallel. With this power storage device, it is possible to make a backup in the event of a momentary power outage or a voltage drop without a maintenance required for a battery.

SUMMARY

A power storage device according to one aspect of the present disclosure includes a plurality of power storage units and a plurality of disconnection units. The plurality of power storage units are electrically connected in parallel between a pair of connection points. The plurality of disconnection units each connect to a corresponding power storage unit in the plurality of power storage units. Each of the plurality of disconnection units is configured to electrically disconnect between the corresponding power storage unit and at least one of the pair of connection points in accordance with flowing of a current at a value more than or equal to a predetermined value in the corresponding power storage unit.

A power supply device according to one aspect of the present disclosure includes the power storage device and a power supply circuit.

A moving body according to one aspect of the present disclosure includes the power storage device and a main body of the moving body configured to utilize an output of the power storage device.

A capacitor according to one aspect of the present disclosure includes an electrolyte. The capacitor is one of a plurality of power storage units included in a power storage device. The power storage device further includes a plurality of disconnection units each connecting to a corresponding power storage unit in the plurality of power storage units. The plurality of power storage units are electrically connected in parallel between a pair of connection points. Each of the plurality of disconnection units is configured to electrically disconnect between the corresponding power storage unit and at least one of the pair of connection points in accordance with flowing of a current at a value more than or equal to a predetermined value in the corresponding power storage unit.

A method for protecting a power storage device according to one aspect of the present disclosure is a method for protecting a power storage device including a plurality of power storage units electrically connected in parallel between a pair of connection points. The method includes a step of electrically disconnecting between at least one of the plurality of power storage units and at least one of the pair of connection points in accordance with flowing of a current at a value more than or equal to a predetermined value in the at least one of the plurality of power storage units.

According to the present disclosure, there is an advantage that even if an abnormality has occurred in some of power storage units, power storage units can be protected.

DETAILED DESCRIPTION OF EMBODIMENT

In the conventional power storage device as described above, if an abnormality such as a short-circuit failure has occurred in one power storage unit of the plurality of power storage units, an overcurrent may flow to the power storage unit of the abnormality from a power storage unit other than the power storage unit of the abnormality.

The present disclosure has been made in view of the above problems, and provides a power storage device, a power supply device, a moving body, a capacitor, and a method for protecting a power storage device, which can protect power storage units even if an abnormality has occurred in some of power storage units.

First Exemplary Embodiment

(1) Overview

Figure 1:
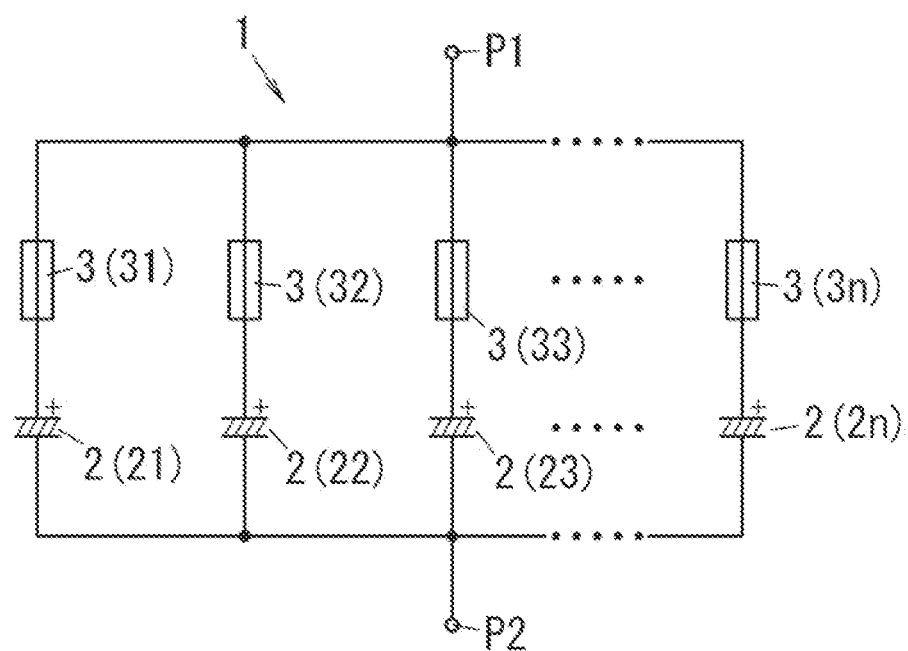
FIG. 1 is a circuit diagram illustrating a configuration of a power storage device according to a first exemplary embodiment.

Power storage device 1 according to the present exemplary embodiment includes a plurality of power storage units 2, as shown in FIG. 1. The plurality of power storage units 2 are electrically connected in parallel between a pair of connection points P1, P2. In the present exemplary embodiment, each of the plurality of power storage units 2 is an electrolytic capacitor. That is, one end (anode) and the other end (cathode) of each of the plurality of power storage units 2 are electrically connected to the pair of connection points P1, P2, respectively.

Power storage device 1 according to the present exemplary embodiment is a device that stores, in the plurality of power storage units 2, electric energy input via the pair of connection points P1, P2 and outputs the electric energy stored in the plurality of power storage units 2 via the pair of connection points P1, P2. When this power storage device 1 is electrically connected to, for example, an output of power supply circuit 101 (see FIG. 2) that outputs a DC voltage, an output voltage of power supply circuit 101 can be smoothed, etc. Alternatively, when this power storage device 1 is electrically connected, for example, between a power supply and a load, power storage device 1 can momentarily (temporarily) pass a large current to the load instead of or together with the power supply. Also, when this power storage device 1 is electrically connected, for example, between a power supply and a load, power storage device 1 can supply backup power to the load even if a power failure, in which a significant drop occurs in the power supplied from the power supply, or the like occurs. The "power failure" described in the present disclosure means not only a state in which the power supplied from a power supply is completely lost, but also a general state in which the power output from a power supply drops to such an extent that operation of a load is hindered. For example, if an abnormality has occurred in a power supply itself, if disconnection, short-circuit, or the like has occurred in wiring between a power supply and power storage device 1, or the like, the power failure may occur.

Here, in power storage device 1 according to the present exemplary embodiment, the plurality of power storage units 2 are electrically connected in parallel between the pair of connection points P1, P2, and hence a capacitance value between the pair of connection points P1, P2 becomes larger than individual power storage unit 2. Thus, power storage device 1 can achieve a function of storing a larger amount of power than individual power storage unit 2, can momentarily (temporarily) output a large current, and the like.

Power storage device 1 according to the present exemplary embodiment includes a plurality of disconnection units 3 in addition to the plurality of power storage units 2. That is, power storage device 1 includes the plurality of power storage units 2 electrically connected in parallel between the pair of connection points P1, P2 and the plurality of disconnection units 3. The plurality of disconnection units 3 each connect to a corresponding power storage unit 2 in the plurality of power storage units 2. When a current having a value more than or equal to a predetermined value flows in corresponding power storage unit 2, each of the plurality of disconnection units 3 electrically disconnects between corresponding power storage unit 2 and at least one of the pair of connection points P1, P2.

In the present disclosure, the "electrically disconnect between power storage unit 2 and at least one of the pair of connection points P1, P2" means that power storage unit 2 is brought to a state of not being powered from the pair of connection points P1, P2. That is, when a current having a value more than or equal to a predetermined value flows in corresponding power storage unit 2, each of the plurality of disconnection units 3 does not need to electrically disconnect both ends of this power storage unit 2 from the pair of connection points P1, P2. At least one end of power storage unit 2 may be electrically disconnected from connection points P1, P2.

According to the above configuration, for example, when an overcurrent flows only in some of power storage units 2 among the plurality of power storage units 2, some of power storage units 2 in which the overcurrent has flowed can be electrically separated from the pair of connection points P1, P2. That is, some of power storage units 2 in which an overcurrent has flowed are electrically disconnected from the pair of connection points P1, P2 by corresponding disconnection units 3. Thereby, a problem (heat generation, power loss, or the like) due to the overcurrent continuing to flow is less likely to occur. As an example, when an abnormality such as a short-circuit failure has occurred in one power storage unit 2 of the plurality of power storage units 2, current from power storage unit 2 other than power storage unit 2 of the abnormality via the pair of connection points P1, P2 flows in power storage unit 2 of the abnormality. At this time, since power storage unit 2 of the abnormality forms a short-circuit path between the pair of connection points P1, P2, short-circuit current flow in power storage unit 2 of the abnormality from power storage unit 2 other than power storage unit 2 of the abnormality. Thus, a current (overcurrent) of a predetermined value or more flows in disconnection unit 3 corresponding to power storage unit 2 of the abnormality. And then power storage unit 2 of the abnormality and the pair of connection points P1, P2 are electrically disconnected by disconnection unit 3.

From the above, power storage device 1 according to the present exemplary embodiment has an advantage that even if an abnormality has occurred in some of power storage units 2, power storage units 2 can be protected.

(2) Details

Hereinafter, power storage device 1, power supply device 100, and moving body 200 according to the present exemplary embodiment will be described in detail with reference to FIGS. 1 to 6B. The drawings referred to below are all schematic ones, and the ratio of the size to the thickness of each constituent element in the drawings does not necessarily reflect the actual dimensional ratio.

(2.1) Configuration

Figure 2:
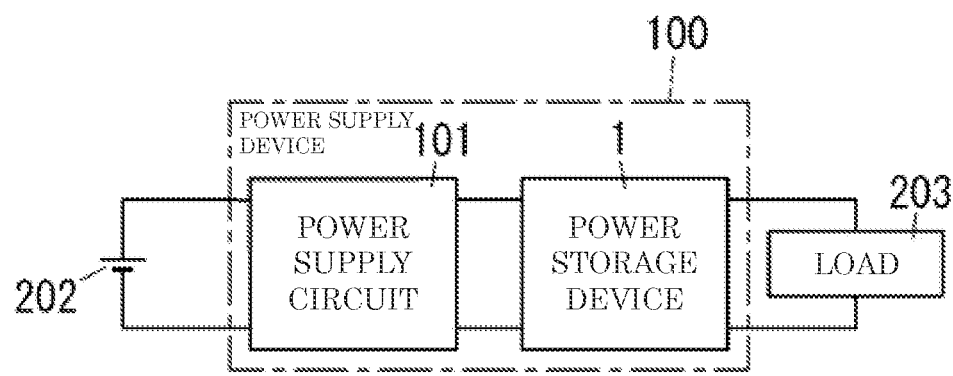
FIG. 2 is a block diagram illustrating a power supply device including the power storage device of the first exemplary embodiment.

Power storage device 1 according to the present exemplary embodiment constitutes power supply device 100 together with power supply circuit 101, as shown in FIG. 2. In other words, power supply device 100 according to the present exemplary embodiment includes power storage device 1 and power supply circuit 101.

In the present exemplary embodiment, power supply circuit 101 as an example is a DC-DC converter, and power supply 202 constituted by a DC power supply is electrically connected to an input terminal of power supply circuit 101, and power storage device 1 is electrically connected to an output terminal of power supply circuit 101. This power supply circuit 101 perform step-down and/or step-up for a DC voltage applied from power supply 202, and outputs the DC voltage to power storage device 1. Power storage device 1 functions as a smoother that smooths an output voltage of power supply device 100. Load 203 is electrically connected to an output terminal of power storage device 1. Here, power storage device 1 is constituted as a module that can be separated from power supply circuit 101. Thus, for example, only power storage device 1 in power supply device 100 can be replaced.

Figure 3:
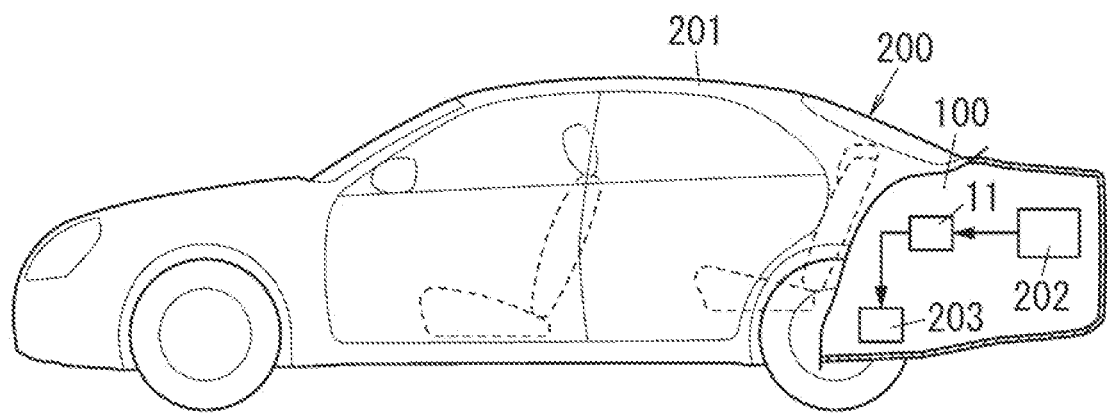
FIG. 3 is a schematic view illustrating a vehicle including the power storage device of the first exemplary embodiment.

Additionally, power supply device 100 according to the present exemplary embodiment constitutes moving body 200 together with main body 201 of moving body 200, as shown in FIG. 3. In other words, moving body 200 according to the present exemplary embodiment includes main body 201 of moving body 200 and power storage device 1. This moving body 200 further includes power supply circuit 101 constituting power supply device 100 together with power storage device 1.

In the present exemplary embodiment, moving body 200 as an example is a vehicle, and includes main body 201 made of a vehicle main body and power supply device 100 (including power storage device 1) mounted on main body 201. Here, moving body 200 as an example is an automobile for driving on a road with a person on it. Moving body 200 is mainly assumed to be an electric car, a hybrid car, or the like, but may be a gasoline engine car or a diesel engine car.

In moving body 200, power supply device 100 is electrically connected, for example, between power supply 202 such as a battery and load 203. Power supply 202 can be charged by using, for example, electric power input from an outside of moving body 200, electric power generated by a generator during driving of moving body 200, regenerative electric power generated by an electric motor, or the like. Load 203 is, for example, a brake system, an air conditioner, or the like that operates by applying a DC voltage while being mounted on main body 201 of moving body 200. In the present exemplary embodiment, power supply circuit 101 of power supply device 100 is a DC-DC converter, as described above. Thus, power supply device 100 performs step-down and/or step-up for the DC voltage applied from power supply 202, further smooths it with power storage device 1, and outputs it to load 203.

In the configuration as described above, power storage device 1 can momentarily (temporarily) provide a large current to load 203 instead of or together with power supply 202. Further, power storage device 1 can supply an electric power to load 203 as a backup power supply even if, for example, a power failure in which a significant drop occurs in an electric power supplied from power supply 202 occurs.

Figure 4:
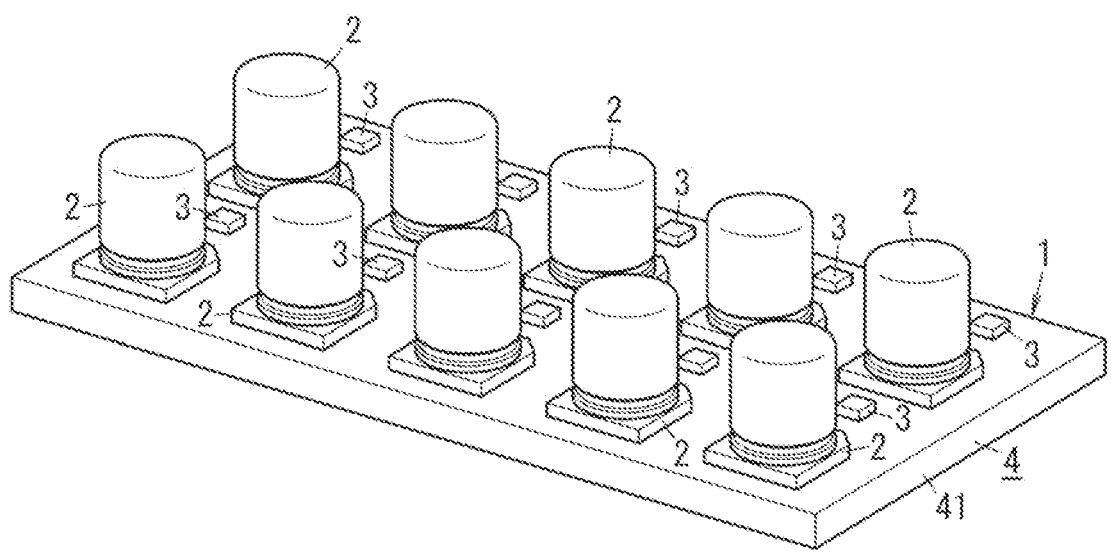
FIG. 4 is a schematic perspective view illustrating the power storage device of the first exemplary embodiment.

As described above, power storage device 1 includes the plurality of power storage units 2 and the plurality of disconnection units 3. In the present exemplary embodiment, power storage device 1 further includes substrate 4 on which the plurality of power storage units 2 are mounted, as shown in FIG. 4. The plurality of power storage units 2 are electrically connected in parallel between the pair of connection points P1, P2. Here, power storage device 1 is formed to include the pair of connection points P1, P2 in constituent elements, but the pair of connection points P1, P2 may not be included in the constituent elements. That is, it is sufficient that the plurality of power storage units 2 are electrically connected in parallel between the pair of connection points P1, P2. The plurality of power storage units 2 may be electrically connected in parallel between a pair of connection points P1, P2 provided, for example, outside power storage device 1.

The pair of connection points P1, P2 are electrically connected to a pair of the output terminals of power supply circuit 101. Thereby, when the plurality of power storage units 2 are charged, the output power of power supply circuit 101 is supplied to the pair of connection points P1, P2. And electric charge (electrical energy) is accumulated in each of the plurality of power storage units 2 by the output power of power supply circuit 101. Load 203 is electrically connected between the pair of connection points P1, P2. Thereby, when the plurality of power storage units 2 are discharged, the electric charges (electrical energy) stored in each of the plurality of power storage units 2 are released via the pair of connection points P1, P2 to load 203.

Here, power supply circuit 101 outputs a DC voltage, and hence the pair of connection points P1, P2 include first connection point P1 on a positive electrode side (high potential side) and second connection point P2 on a negative electrode side (low potential side). In the present exemplary embodiment, each of the pair of connection points P1, P2 is a part of conductor layer 42 (see FIG. 5) included in substrate 4. And the pair of connection points P1, P2 are connected to, via electric wires, load 203 and the pair of output terminals of power supply circuit 101. It is noted that the "connection point" referred to in the present disclosure does not have to be a part of conductor layer 42 included in substrate 4. The "connection point" may be, for example, a component (terminal) for connecting an electric wire or the like, a lead of an electronic component, or the like.

In the present exemplary embodiment, the plurality of constituent elements forming power supply device 100 (including power storage device 1) are all housed in one housing 11 (see FIG. 3). As shown in FIG. 3, housing 11 is fixed to main body 201 of moving body 200. Power supply 202, load 203, and the like are mounted on main body 201 of moving body 200 together with power supply device 100 (including power storage device 1).

Figure 5:
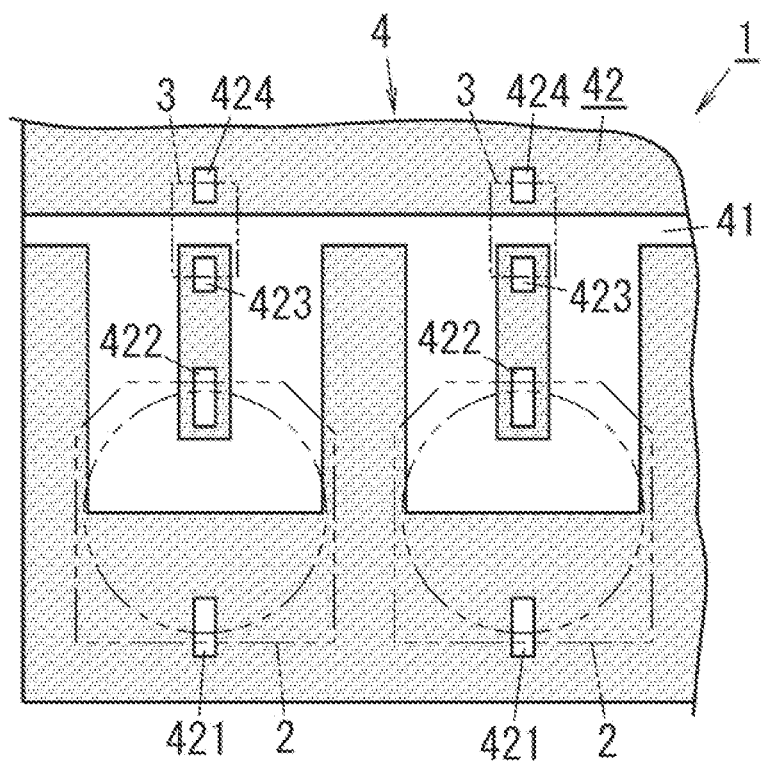
FIG. 5 is a schematic plan view illustrating a main part of the power storage device of the first exemplary embodiment.

Substrate 4 is a printed wiring board having insulating substrate 41 and conductor layer 42 (see FIG. 5). Here, substrate 4 as an example is a single-sided printed wiring board in which conductor layer 42 is formed only in one surface, in a thickness direction, of insulating substrate 41.

In the present exemplary embodiment, at least one power storage unit 2 of the plurality of power storage units 2 is an electrolytic capacitor containing a liquid electrolyte (electrolyte solution). The electrolytic capacitor includes an anode member, a cathode member, and an electrolyte. The anode member has an anode base material made of a valve metal and a dielectric layer formed on a surface of the anode base material. The valve metal includes, for example, aluminum, tantalum, niobium, titanium, hafnium, zirconium, zinc, tungsten, bismuth, antimony, etc., and alloys containing these. The cathode member as an example is made of a metal foil such as aluminum, but various configurations can be adopted as the cathode member without being limited to this configuration as long as it functions as a cathode of the electrolytic capacitor. The electrolyte is disposed between the anode member and the cathode member. In the present exemplary embodiment, each power storage unit 2 contains, as the electrolyte, a liquid electrolyte (electrolyte solution) and a solid electrolyte. The electrolyte solution contains a solvent, an acid component, and a base component. As the solid electrolyte, a conductive polymer such as polythiophene, PPy (polypyrrole), PEDOT (polyethylenedioxythiophene), or polyaniline; a TCNQ complex salt; or the like is used.

In the present exemplary embodiment, each of the plurality of power storage units 2 is made of an aluminum electrolytic capacitor containing, as an electrolyte, a conductive polymer and an electrolyte solution. This type of aluminum electrolytic capacitor can reduce an equivalent series resistance (ESR) to a low level, improve repairability of a dielectric layer, and reduce a leakage current. Such an aluminum electrolytic capacitor is a capacitor that is preferably used in power storage device 1 as one of the plurality of power storage units 2.

These plurality of power storage units 2 are electrically connected in parallel between the pair of connection points P1, P2 by using conductor layer 42 in substrate 4. A number of power storage units 2 included in power storage device 1 may be two or more, or may be several tens or 100 or more. FIG. 4 illustrates, as an example, a case where power storage device 1 includes ten power storage units 2. With power storage devices 1 including the plurality of power storage units 2 electrically connected in parallel as described above, power storage device 1 as a whole can achieve a larger capacitance than single power storage unit 2 and reduce the ESR to a lower level.

The plurality of disconnection units 3 have a one-to-one correspondence with the plurality of power storage units 2, respectively. That is, each of the plurality of disconnection units 3 is electrically connected in series to corresponding power storage unit 2 between the pair of connection points P1, P2, in order to form a series circuit together with corresponding power storage unit 2. In other words, a plurality of series circuits each configured by power storage unit 2 and disconnection unit 3 that correspond to each other are electrically connected in parallel between the pair of connection points P1, P2, as shown in FIG. 1. That is, the plurality of power storage units 2 are electrically connected in parallel to the pair of connection points P1, P2 via respectively corresponding disconnection units 3.

Specifically, each disconnection unit 3 is disposed between an anode terminal of corresponding power storage unit 2 and first connection point P1 on the positive electrode side (high potential side). That is, the anode terminal of power storage unit 2 is connected to first connection point P1 via disconnection unit 3, and a cathode terminal of power storage unit 2 is directly connected to second connection point P2 on the negative electrode side (low potential side), not via disconnection unit 3.

In the present exemplary embodiment, at least one disconnection unit 3 of the plurality of disconnection units 3 is a fuse. Here, each of the plurality of disconnection units 3 includes a current fuse. Each of these plurality of disconnection units 3 is electrically connected in series to corresponding power storage unit 2 between the pair of connection points P1, P2 via conductor layer 42 in substrate 4. A number of disconnection units 3 included in power storage device 1 may be two or more, or may be several tens or 100 or more. In the present exemplary embodiment, power storage device 1 as an example includes disconnection units 3 in the same number as power storage units 2 (ten disconnection units 3 in the example of FIG. 4).

When a current having a value more than or equal to a predetermined value or more flows in one power storage unit 2 of the plurality of power storage units 2, corresponding one of the plurality of disconnection units 3 electrically disconnects between power storage unit 2 and the pair of connection points P1, P2, as described above. The "predetermined value" referred to in the present disclosure means a current value that serves as a threshold value for each disconnection unit 3 to operate, that is, a threshold value for each disconnection unit 3 to electrically disconnect between corresponding power storage unit 2 and the pair of connection points P1, P2. In the present exemplary embodiment, each disconnection unit 3 is a current fuse, and hence the "predetermined value" is equal to a disconnection current of the current fuse. Thus, each disconnection unit 3 conducts a current between corresponding power storage unit 2 and the pair of connection points P1, P2 when the current flowing in corresponding power storage unit 2 has a value less than the predetermined value. And when a current at a value more than or equal to the predetermined value flows in corresponding power storage unit 2, corresponding disconnection unit 3 disconnects between corresponding power storage unit 2 and the pair of connection points P1, P2. In particular, in the present exemplary embodiment, when, by flowing a current from power storage unit 2 other than corresponding power storage unit 2 among the plurality of power storage units 2, the current at a value more than or equal to the predetermined value flows, corresponding plurality of disconnection unit 3 electrically disconnects between corresponding power storage unit 2 and the pair of connection points P1, P2. Specifically, the predetermined value is set to be 3 times or more and 20 times or less of a rated current of corresponding power storage unit 2. The operation of disconnection unit 3 will be described in detail in the section of "(2.2) Operation."

In the following description, when the plurality of power storage units 2 are distinguished from each other, each of the plurality of power storage units 2 is referred to as "power storage unit 21", "power storage unit 22", "power storage unit 23", . . . , or "power storage unit 2n." Similarly, when the plurality of disconnection units 3 are distinguished from each other, each of the plurality of disconnection units 3 is referred to as "disconnection unit 31", "disconnection unit 32", "disconnection unit 33", . . . , or "disconnection unit 3n." The "n" is a natural number. Here, power storage unit 2 and disconnection unit 3, having the same "n", correspond to each other, and are electrically connected in series between the pair of connection points P1, P2. That is, for example, power storage unit 21 and disconnection unit 31 correspond to each other, and power storage unit 21 and disconnection unit 31 are electrically connected in series between the pair of connection points P1, P2. Similarly, power storage unit 22 and disconnection unit 32 correspond to each other, and power storage unit 22 and disconnection unit 32 are electrically connected in series between the pair of connection points P1, P2. In this way, the plurality of power storage units 21, 22, 23, . . . , 2n are electrically connected in parallel to the pair of connection points P1, P2 via respectively corresponding disconnection units 31, 32, 33, . . . , 3n.

In the present exemplary embodiment, each of the plurality of power storage units 2 is a surface-mount type component having a columnar shape. Each of the plurality of power storage units 2 is mounted on the surface, on which conductor layer 42 is provided, of substrate 4. In more detail, each of the plurality of power storage units 2 is mechanically and electrically connected to electrode areas 421, 422 of conductor layer 42 by soldering, as shown in FIG. 5. Here, the cathode terminal of power storage unit 2 is connected to electrode area 421 among electrode areas 421, 422, and the anode terminal of power storage unit 2 is connected to electrode area 422 among electrode areas 421, 422.

In the present exemplary embodiment, each of the plurality of disconnection units 3 is a surface-mount type component having a chip shape. Each of the plurality of disconnection units 3, together with the plurality of power storage units 2, is mounted on the surface, on which conductor layer 42 is provided, of substrate 4. In more detail, each of the plurality of disconnection units 3 is mechanically and electrically connected to electrode areas 423, 424 of conductor layer 42 by soldering, as shown in FIG. 5.

FIG. 5 is a plan view illustrating a part of substrate 4 of power storage device 1, seen from a direction facing the surface on which conductor layer 42 is provided, in which power storage unit 2 and disconnection unit 3 are shown by imaginary lines (two-dot chain lines). Additionally, conductor layer 42 (excluding electrode areas 421 to 424) is shaded (dot-hatched) in FIG. 5.

(2.2) Operation

Next, the operation of power storage device 1 having the above configuration will be described with reference to FIGS. 6A and 6B.

Here, for example, it is assumed to be a case that an abnormality such as a short-circuit failure occurs in one power storage unit 22 of the plurality of power storage units 21, 22, 23, . . . , 2n while the plurality of power storage units 2 are being charged, that is, while the output power of power supply circuit 101 is being supplied to the pair of connection points P1, P2. The "such as a short-circuit failure" referred to in the present disclosure means all failures of a short-circuit mode in power storage unit 2. That is, "such as a short-circuit failure" means not only a state in which the pair of terminals (anode terminal and cathode terminal) of power storage unit 2 are electrically short-circuited, but also a state in which a resistance value between the pair of terminals of power storage unit 2 drops more significantly than a normal state because of a decrease in insulation property or the like.

In a normal state in which all of the plurality of power storage units 22 normally operate, power is supplied from power supply circuit 101 to the pair of connection points P1, P2, so that charging current Ic1 flows in the plurality of power storage units 2. At this time, a current having a value obtained by dividing a current value of charging current Ic1 by the number of power storage units 2 flows in each power storage unit 2 in a condition that there is no variation in voltage across both ends of respective power storage units 2 in the plurality of power storage units 2.

Figure 6A:
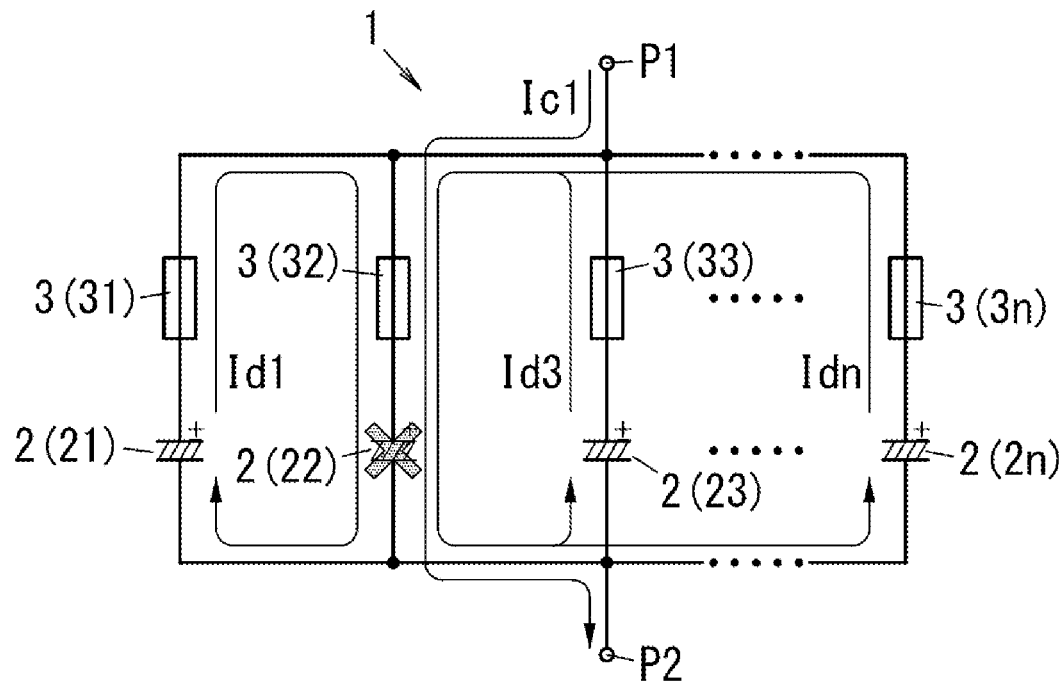
FIG. 6A is an explanatory diagram showing a state before operation of a disconnection unit in the power storage device of the first exemplary embodiment.

In this state, if an abnormality such as a short-circuit failure occurs in power storage unit 22, a larger current flows in power storage unit 22 than the normal state, as shown in FIG. 6A. In FIG. 6A, a state in which an abnormality such as a short-circuit failure occurs in power storage unit 22 is indicated by an "x" mark attached to power storage unit 22.

That is, in addition to charging current Ic1 flowing between the pair of connection points P1, P2, discharge currents from power storage units 2 (power storage units 21, 23, . . . , 2n), which are other than power storage unit 22, among the plurality of power storage units 2 flow in power storage unit 22. The "discharge current" referred to in the present disclosure means a current output from power storage unit 2, occurring when power storage unit 2 releases the electrical energy stored in power storage unit 2, that is, occurring when power storage unit 2 discharges. The discharge currents of power storage units 2 other than power storage unit 22 include discharge current Id1 of power storage unit 21, discharge current Id3 of power storage unit 23, and discharge current Idn of power storage unit 2n.

When an abnormality such as a short-circuit failure occurs in power storage unit 22, power storage unit 22 forms a short-circuit path between the pair of connection points P1, P2. Hence, when the plurality of power storage units 2 are all connected to the pair of connection points P1, P2, discharge currents (Id1, Id3, . . . , Idn) from power storage units 2 other than power storage unit 22 via the pair of connection points P1, P2 flow in power storage unit 22 that forms a short-circuit path. As a result, a larger current than the normal state, that is, a so-called overcurrent (including a short-circuit current) flows in power storage unit 22.

Here, in power storage device 1 according to the present exemplary embodiment, by providing the plurality of disconnection units 3 having a one-to-one correspondence with the plurality of power storage units 2, power storage units 2 can be protected even if an abnormality has occurred in some of power storage units 2, as described above. That is, when a current having a value more than or equal to the predetermined value flows in corresponding power storage unit 2 of the plurality of power storage units 2, corresponding disconnection unit 3 electrically disconnects between corresponding power storage unit 2 and the pair of connection points P1, P2.

In the example of FIG. 6A, a current having a value more than or equal to the predetermined value flows in power storage unit 22, and hence disconnection unit 32 corresponding to power storage unit 22 operates to electrically disconnect between power storage unit 22 and the pair of connection points P1, P2. When an overcurrent flows in power storage unit 22, a current having a value more than several tens of times the rated current of power storage unit 22 flows in power storage unit 22, as described above. At this time, an overcurrent having the same value as power storage unit 22 also flows in disconnection unit 32 corresponding to power storage unit 22, which is electrically connected in series to power storage unit 22 between the pair of connection points P1, P2. In the present exemplary embodiment, disconnection unit 32 is a current fuse, and hence a fuse element of the current fuse is fused when the value of a current flowing in power storage unit 22 and disconnection unit 32 becomes more than or equal to a predetermined value (disconnection current). Thereby, when a current having a value more than or equal to the predetermined value flows in power storage unit 22, disconnection unit 32 electrically disconnects between power storage unit 22 and the pair of connection points P1, P2, as shown in FIG. 6B. In FIG. 6B, a state in which disconnection unit 32 operates, that is, a state in which disconnection unit 32 electrically disconnects between power storage unit 22 and connection point P2 is indicated by an "x" mark attached to disconnection unit 32.

In the present exemplary embodiment, as described above, when a current from power storage unit 2 other than corresponding power storage unit 2 among the plurality of power storage units 2 flows in corresponding power storage unit 2, corresponding disconnection unit 3 electrically disconnects between corresponding power storage unit 2 and the pair of connection points P1, P2, because a current having a value more than or equal to the predetermined value flows in corresponding disconnection unit 3. In other words, if an abnormality such as a short-circuit failure occurs in one power storage unit 22 among the plurality of power storage units 21, 22, 23, . . . , 2n, currents (discharge currents) from other power storage units 2 flow in power storage unit 22 in which the abnormality has occurred.

In the present exemplary embodiment, as described above, when a current from power storage unit 2 other than corresponding power storage unit 2 among the plurality of power storage units 2 flows in corresponding power storage unit 2, corresponding disconnection unit 3 electrically disconnects between corresponding power storage unit 2 and the pair of connection points P1, P2 because a current having a value more than or equal to the predetermined value flows in corresponding disconnection unit 3. Thus, due to the currents (discharge currents) flowing from other power storage units 2 to power storage unit 22, an overcurrent having more than or equal to a predetermined value (disconnection current of disconnection unit 3) flows in power storage unit 22, so that disconnection unit 32 operates. That is, disconnection unit 32 electrically disconnects between corresponding power storage unit 22 and the pair of connection points P1, P2 by utilizing the discharge currents of power storage units 2 other than corresponding power storage unit 22. Thereby, a current path between the pair of connection points P1, P2 and power storage unit 22 is disconnected by disconnection unit 32, as shown in FIG. 6B, so that the current (overcurrent) does not flow in power storage unit 22.

According to power storage device 1 of the present exemplary embodiment, when an abnormality has occurred in some of power storage units 22, some of power storage units 22 in which the abnormality has occurred is electrically separated from the pair of connection points P1, P2, as described above. As a result, it is possible to avoid a situation that an overcurrent continues to flow in some of power storage unit 22 in which the abnormality has occurred. Thereby, a problem (heat generation, power loss, or the like), occurring when an overcurrent continues to flow in power storage unit 2, is less likely to occur. Thereby, some of power storage unit 22, in which the abnormality has occurred, and normal power storage units 2 (power storage units 2 in which no abnormality has occurred) can be protected. Thus, power storage device 1 according to the present exemplary embodiment has an advantage that even if an abnormality has occurred in some of power storage units 2, power storage units 2 can be protected.

Further, some of power storage units 2 in which the abnormality has occurred are electrically separated from the pair of connection points P1, P2, and hence normal power storage units 2 can be continuously used. That is, power storage unit 22 that forms the short-circuit path is electrically separated from the pair of connection points P1, P2 in the example of FIG. 6B, and hence power storage units 2 other than power storage unit 22 can be continuously used. Hence, when an abnormality has occurred in some of power storage units 2, remaining normal power storage units 2 can secure a function as power storage device 1 although the number of power storage units 2 decreases. Thus, reliability of power storage device 1 can be improved.

In a situation that the plurality of power storage units 2 are being discharged, that is, while the electric charges (electrical energy) stored in each of the plurality of power storage units 2 are being released from the pair of connection points P1, P2 to load 203, power storage device 1 operates in the same way as while the plurality of power storage units 2 are being charged. That is, according to power storage device 1 of the present exemplary embodiment, when an abnormality has occurred in some of power storage units 2, disconnection units 3, corresponding to power storage units 2 in which the abnormality has occurred, operate even while power storage units 2 are being discharged. Thereby, power storage units 2 can be protected.

Figure 6B:
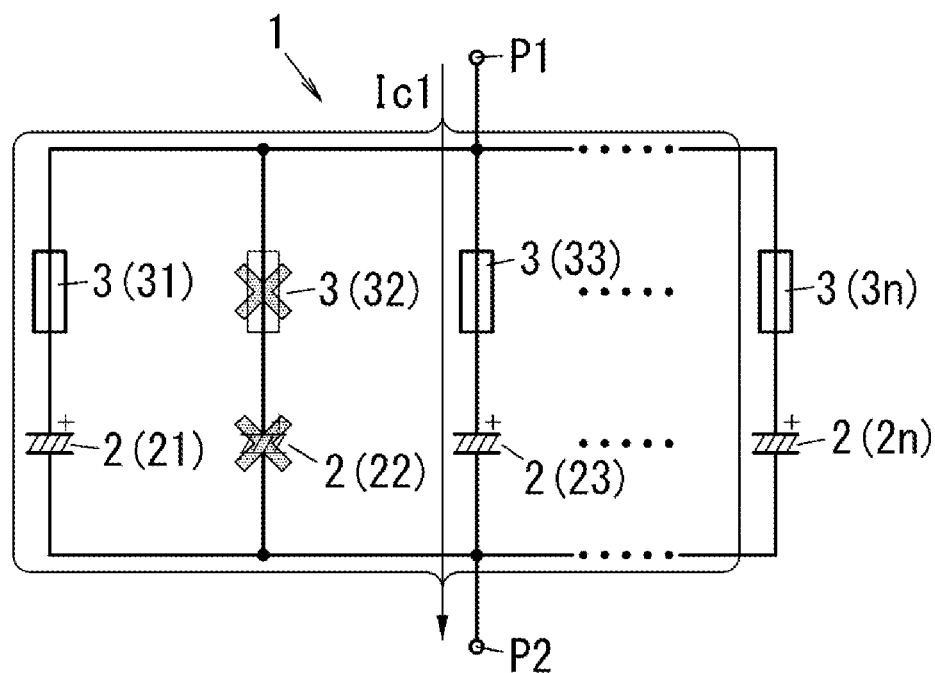
FIG. 6B is an explanatory diagram showing a state after the operation of the disconnection unit in the power storage device of the first exemplary embodiment.

In FIGS. 6A and 6B, a case where an abnormality such as a short-circuit failure has occurred in power storage unit 22 is illustrated, but it is not limited to this example. Power storage device 1 operates in the same way as described above even if the abnormality has occurred in one power storage unit 2 other than power storage unit 22. Furthermore, according to power storage device 1 of the present exemplary embodiment, even if an abnormality has occurred in two or more power storage units 2, two or more disconnection units 3, corresponding to power storage units 2 in which the abnormality has occurred, operate in the same way as described above. Thereby, power storage units 2 can be protected.

According to power storage device 1 of the present exemplary embodiment, even if an abnormality such as a short-circuit failure occurs in some of power storage units 2 among the plurality of power storage units 2, disconnection units 3, corresponding to power storage units 2 in which the abnormality has occurred, operate. Thereby, power storage units 2 can be protected. For example, if it is assumed that an abnormality occurs at a rate of 1 in 1 million with a capacitor to be used as individual power storage unit 2, the abnormality may occur, for a long time use, at a rate of 1 in 50,000 with power storage device 1 that includes 20 power storage units 2 electrically connected in parallel. According to power storage device 1 of the present exemplary embodiment, even if a failure (abnormality) occurs in some of power storage units 2, the function as power storage device 1 can be ensured by remaining normal power storage units 2. Thereby, a rate of occurrence of failure (abnormality) as power storage device 1 can be reduced.

(3) Modification Examples

The first exemplary embodiment is only one of various exemplary embodiments of the present disclosure. The first exemplary embodiment can be variously modified depending on design, etc., as long as objects of the present disclosure are achieved. Additionally, the same functions as those of power storage device 1 may be embodied by a method for protecting a power storage device, a computer program, a non-temporary recording medium on which a program is recorded, or the like. A method for protecting a power storage device according to one aspect is a method for protecting power storage device 1 including the plurality of power storage units 2 electrically connected in parallel between the pair of connection points P1, P2. This protection method includes disconnection processing in which if a current having a value more than or equal to a predetermined value flows in one or more power storage units 2 of the plurality of power storage units 2, one or more power storage units 2 and the pair of connection points P1, P2 are electrically disconnected. Here, the disconnection processing corresponds to the processing for operating disconnection unit 3 in power storage device 1. The modification examples described below can be applied in combination as appropriate.

Moving body 200 is not limited to an automobile, but may be a two-wheeled vehicle (including an electric bike), an aircraft, a ship, a drone, or the like.

Also, power storage device 1 is not limited to moving body 200, and may be used, for example, in power supply device 100 for a central processing unit (CPU) of a server device, a computer device, a home-use game machine, or the like. In addition, power storage device 1 is used in, for example, power supply device 100 for a field-programmable gate array (FPGA) of communication equipment, industrial equipment, or the like, power supply device 100 for a graphics processing unit (GPU) of a graphic board, or the like. The applications of power storage device 1 are not limited to these, and power storage device 1 can be used in various fields.

Additionally, power supply circuit 101 is not limited to a DC-DC converter, and may be, for example, an inverter circuit that converts a DC voltage applied from power supply 202 into an AC voltage. In this case, power storage device 1 is electrically connected to an input terminal of power supply circuit 101. That is, power storage device 1 functions as a smoother that smooths an input voltage of power supply circuit 101.

Additionally, a capacitor to be used as at least one power storage unit 2 of the plurality of power storage units 2 is not limited to one having a two-terminal structure having two terminals, and may have a structure having three or more terminals.

Additionally, at least one power storage unit 2 of the plurality of power storage units 2 is preferably an electrolytic capacitor containing a liquid electrolyte from the viewpoint of improving the repairability of the dielectric layer, and may be, for example, a wet aluminum electrolytic capacitor not containing, as an electrolyte, a conductive polymer but using an electrolyte solution. That is, each power storage unit 2 is not limited to an aluminum electrolytic capacitor using, as an electrolyte, an electrolyte solution (or solvent component) and a conductive polymer. Additionally, each power storage unit 2 is not limited to an electrolytic capacitor containing a liquid electrolyte, and may be, for example, a solid electrolytic capacitor using a solid electrolyte such as a conductive polymer, manganese dioxide, or an organic semiconductor. Even with an electrolytic capacitor using a solid electrolyte as described above, an abnormality such as a short-circuit failure may occur. Thus, power storage device 1 according to the first exemplary embodiment has an advantage that if an abnormality has occurred in some of power storage units 2, power storage units 2 can be protected. Alternatively, each power storage unit 2 may be a power storage device other than an electrolytic capacitor, examples of which include an electric double-layer capacitor (EDLC) and a secondary battery such as a lithium ion battery (LIB).

Alternatively, each power storage unit 2 is not limited to an EDLC, and may be, for example, an electrochemical device having a configuration described below. The electrochemical device referred to here includes a positive electrode member, a negative electrode member, and a non-aqueous electrolyte solution. The positive electrode member has a positive electrode current collector and a positive electrode material layer supported on the positive electrode current collector and containing a positive electrode active material. The positive electrode material layer contains a conductive polymer as a positive electrode active material that dopes and dedopes anions (dopants). The negative electrode member has a negative electrode material layer containing a negative electrode active material. The negative electrode active material as an example is a substance for proceeding with a redox reaction accompanied by occlusion and release of lithium ions, and specifically, a carbon material, a metal compound, an alloy, a ceramic material, or the like. The non-aqueous electrolyte as an example has lithium ion conductivity. This type of non-aqueous electrolyte contains a lithium salt and a non-aqueous solution that dissolves the lithium salt. The electrochemical device having such a configuration has a higher energy density than an EDLC, etc.

Additionally, it is not an essential configuration for power storage device 1 that the plurality of power storage units 2 are power storage devices having the same structure (type), and the plurality of power storage units 2 may include power storage devices having different structures (types).

Additionally, at least one power storage unit 2 of the plurality of power storage units 2 may be formed by two or more power storage devices (electrolytic capacitors, etc.) electrically connected in parallel, in series, or in parallel and series. That is, one power storage unit 2 may be achieved by a parallel circuit or series circuit of two or more power storage devices, or a combination thereof.

It is also not an essential configuration for power storage device 1 that each disconnection unit 3 is disposed between the anode terminal of corresponding power storage unit 2 and first connection point P1 on the positive electrode side (high potential side). That is, each disconnection unit 3 may be disposed between the cathode terminal of corresponding power storage unit 2 and second connection point P2 on the negative electrode side (low potential side). Alternatively, disconnection units 3 may be disposed both between the anode terminal of power storage unit 2 and first connection point P1 and between the cathode terminal of power storage unit 2 and second connection point P2.

It is also not an essential configuration for power storage device 1 that disconnection units 3 are electrically connected to all of the plurality of power storage units 2 connected in parallel. Power storage device 1 may include power storage unit 2 electrically connected between the pair of connection points P1, P2, not via disconnection unit 3. In other words, power storage device 1 may include, in addition to the plurality of power storage units 2 electrically connected to the pair of connection points P1, P2 via respective disconnection units 3, one or more power storage units 2 electrically connected to the pair of connection points P1, P2, not via disconnection units 3.

The fuse to be used as each disconnection unit 3 is not limited to one having a chip shape, and may be, for example, a replaceable fuse such as a tube fuse. Alternatively, the fuse to be used as each disconnection unit 3 is not limited to a current fuse, and may be, for example, a thermal fuse.

Alternatively, each disconnection unit 3 is not limited to a fuse, and may be, for example, an element having a function of recovering from a disconnection state to a conduction state, such as a breaker using a bimetal. Alternatively, each disconnection unit 3 may include a switch made of a relay, a semiconductor switch element, or the like, and a control unit that controls the switch. In this case, each of the plurality of disconnection units 3 monitors magnitude of a current flowing in corresponding power storage unit 2 of the plurality of power storage units 2. When a current having a value more than or equal to a predetermined value flows in corresponding power storage unit 2, disconnection unit 3 opens the switch by the control unit.

In the present disclosure, the expression of "more than or equal to" described in the comparison of two values of the magnitude of current (current values), a predetermined value, etc., include both the case where the two values are equal and the case where one of the two values exceeds the other.

Second Exemplary Embodiment

Figure 7:
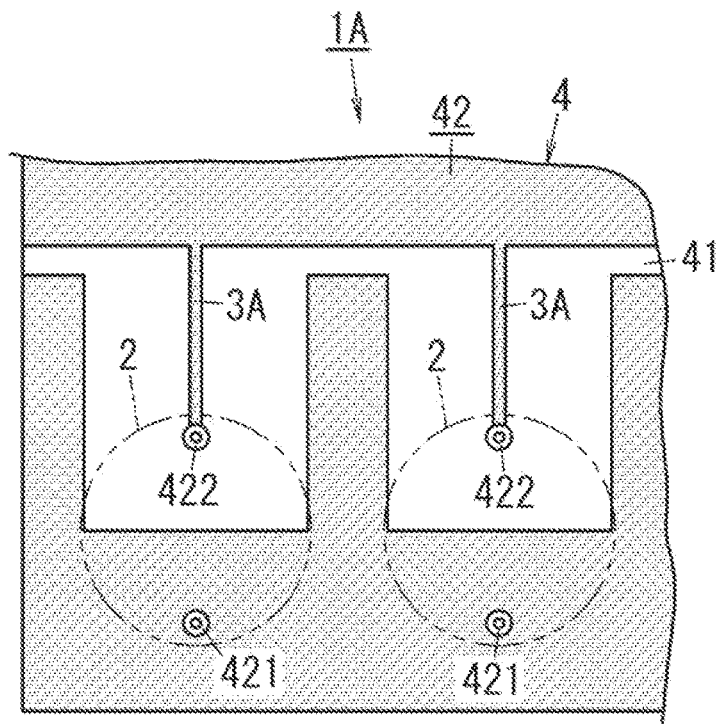
FIG. 7 is a schematic plan view illustrating a main part of a power storage device according to a second exemplary embodiment.

In power storage device 1A according to the present exemplary embodiment, a configuration of each disconnection unit 3A is different from that of power storage device 1 according to the first exemplary embodiment, as shown in FIG. 7. Hereinafter, the same configurations as those in the first exemplary embodiment will be denoted by the same reference numerals, and the description thereof will be appropriately omitted.

In the present exemplary embodiment, power storage device 1A includes substrate 4 on which a plurality of power storage units 2 are mounted. At least one disconnection unit 3A of the plurality of disconnection units 3A is conductor layer 42 formed in substrate 4. In the present exemplary embodiment, each power storage unit 2 is a through-hole mount type component, not a surface-mount type component.

That is, in the present exemplary embodiment, disconnection unit 3A is formed by forming a part of conductor layer 42 in substrate 4 to be narrower than other portions, that is, to be smaller in width, as shown in FIG. 7. Specifically, each of the plurality of power storage units 2 is mechanically and electrically connected to electrode areas 421, 422 of conductor layer 42 by soldering. A part of a portion, leading to one of electrode areas 421, 422 (electrode area 422 in the example of FIG. 7), of conductor layer 42 is formed in a narrow line shape, thereby functioning as disconnection unit 3A. FIG. 7 is a plan view of a part of substrate 4 of power storage device 1A, seen from a side of conductor layer 42, in which power storage unit 2 is shown by an imaginary line (two-dot chain line). Also, conductor layer 42 (excluding electrode areas 421, 422) is shaded (dot-hatched) in FIG. 7.

In power storage device 1A according to the present exemplary embodiment, disconnection unit 3A, made of a part of conductor layer 42 in substrate 4, is fused when a value of a current flowing in power storage unit 2 becomes more than or equal to a predetermined value, instead of a fuse element of a current fuse. Thereby, when a current having a value more than or equal to the predetermined value flows in corresponding power storage unit 2, disconnection unit 3A electrically disconnects between corresponding power storage unit 2 and the pair of connection points P1, P2.

According to the configuration of the present exemplary embodiment described above, disconnection unit 3A is achieved by a part of conductor layer 42 in substrate 4, and hence power storage units 2 can be protected even if an abnormality has occurred in some of power storage units 2, without separately using a component such as a fuse.

The configuration described in the second exemplary embodiment can be applied in combination as appropriate with the configuration (including the modification examples) described in the first exemplary embodiment.

Third Exemplary Embodiment

Figure 8:
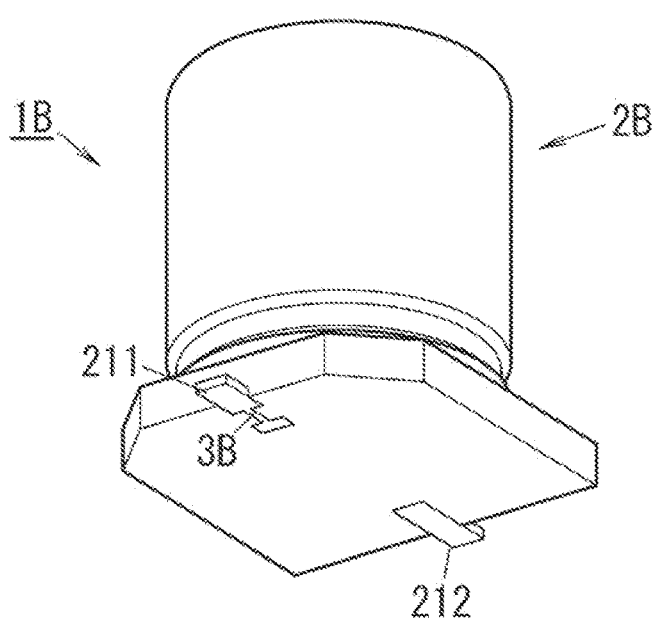
FIG. 8 is a schematic perspective view illustrating one power storage unit of a power storage device according to a third exemplary embodiment.

In power storage device 1B according to the present exemplary embodiment, a configuration of each disconnection unit 3B is different from that of power storage device 1 according to the first exemplary embodiment, as shown in FIG. 8. Hereinafter, the same configurations as those in the first exemplary embodiment will be denoted by the same reference numerals, and the description thereof will be appropriately omitted. FIG. 8 shows only one power storage unit 2B of the plurality of power storage units 2B in power storage device 1B.

In the present exemplary embodiment, at least one disconnection unit 3B of the plurality of disconnection units 3B is integrated with corresponding power storage unit 2B. Here, disconnection unit 3B is constituted by forming a part of a current path in power storage unit 2B to be narrower than other portions, that is, to be smaller in width, as shown in FIG. 8. Specifically, power storage unit 2B has a pair of lead terminals 211, 212, and a part of one of the pair of lead terminals 211, 212 (lead terminal 211 in the example of FIG. 8) is formed in a narrow line shape, thereby functioning as disconnection unit 3B.

In power storage device 1B according to the present exemplary embodiment, disconnection unit 3B, made of a part of lead terminal 211, is fused when a value of a current flowing in power storage unit 2B becomes more than or equal to a predetermined value, instead of a fuse element of a current fuse. Thereby, when a current having a value more than or equal to the predetermined value flows in corresponding power storage unit 2B, disconnection unit 3B electrically disconnects between corresponding power storage unit 2B and the pair of connection points P1, P2.

According to the configuration of the present exemplary embodiment described above, disconnection unit 3B is achieved by a part of power storage unit 2B, and hence power storage units 2B can be protected even if an abnormality has occurred in some of power storage units 2B, without separately using a component such as a fuse.

In the present exemplary embodiment, an example in which a part of lead terminals 211, 212 is used as disconnection unit 3B is shown, but the present disclosure is not limited to this example, and at least one disconnection unit 3B of the plurality of disconnection units 3B may be integrated with corresponding power storage unit 2B. For example, power storage unit 2B may have a built-in fuse as disconnection unit 3B, or a bonding wire provided in power storage unit 2B may function as disconnection unit 3B.

The configuration (including the modification examples) described in the third exemplary embodiment can be applied in combination as appropriate with the configurations (including the modification examples) described in the first and second exemplary embodiments.

(Summary)

As described above, power storage device (1, 1A, 1B) according to a first aspect includes a plurality of power storage units (2, 2B) and a plurality of disconnection units (3, 3A, 3B). The plurality of power storage units (2, 2B) are electrically connected in parallel between a pair of connection points (P1, P2). The plurality of disconnection units (3, 3A, 3B) each connect to corresponding power storage unit (2, 2B) in the plurality of power storage units (2, 2B). Each of the plurality of disconnection units (3, 3A, 3B) is configured to electrically disconnect between corresponding power storage unit (2, 2B) and at least one of the pair of connection points (P1, P2) in accordance with flowing of a current at a value more than or equal to a predetermined value in the corresponding power storage unit (2, 2B).

According to this aspect, for example, when an overcurrent flows in only some of power storage units (2, 2B) among the plurality of power storage units (2, 2B), only some of power storage units (2, 2B) in which the overcurrent has flowed can be electrically separated from the pair of connection points (P1, P2). That is, some of power storage units (2, 2B) in which the overcurrent has flowed are electrically disconnected from the pair of connection points (P1, P2) by corresponding disconnection units (3, 3A, 3B). Thereby, a problem, occurring when an overcurrent continues to flow, is less likely to occur. As a result, power storage device (1, 1A, 1B) have an advantage that even if an abnormality has occurred in some of power storage units (2, 2B), power storage units (2, 2B) can be protected.

In power storage device (1, 1A, 1B) according to a second aspect in the first aspect, at least one of the plurality of disconnection units (3, 3A, 3B) is a fuse.

According to this aspect, a predetermined value at which each disconnection unit (3, 3A, 3B) operates can be arbitrarily changed depending on selection of the fuse, so that a degree of freedom in design is increased.

Power storage device (1, 1A, 1B) according to a third aspect in the first or second aspect further includes substrate (4) on which a plurality of power storage units (2, 2B) are mounted. At least one of the plurality of disconnection units (3, 3A, 3B) is conductor layer (42) disposed on substrate (4).

According to this aspect, the function of disconnection unit (3, 3A, 3B) can be achieved without separately using a component such as a fuse.

In power storage device (1, 1A, 1B) according to a fourth aspect in any one of the first to third aspects, at least one of the plurality of disconnection units (3, 3A, 3B) is integrated with corresponding power storage unit (2, 2B).

According to this aspect, the function of disconnection unit (3, 3A, 3B) can be achieved without separately using a component such as a fuse.

In power storage device (1, 1A, 1B) according to a fifth aspect in any one of the first to fourth aspects, the flowing of a current at a value more than or equal to the predetermined value in the corresponding power storage unit (2, 2B) is caused by a current flowing from a power storage unit (2, 2B) other than the corresponding power storage unit (2, 2B) among the plurality of power storage units (2, 2B).

According to this aspect, disconnection unit (3, 3A, 3B) can electrically disconnect between corresponding power storage unit (2, 2B) and the pair of connection points (P1, P2) by utilizing discharge currents of power storage units (2, 2B) other than corresponding power storage unit (2, 2B).

In power storage device (1, 1A, 1B) according to a sixth aspect in any one of the first to fifth aspects, at least one of the plurality of power storage units (2, 2B) is an electrolytic capacitor including a liquid electrolyte.

According to this aspect, a plurality of electrolytic capacitors having a relatively large capacitance are electrically connected in parallel, and hence a capacitance of power storage device (1, 1A, 1B) can be further increased.

Power supply device (100) according to a seventh aspect includes power storage device (1, 1A, 1B) according to any one of the first to sixth aspects and power supply circuit (101).

According to this aspect, for example, when an overcurrent flows in only some of power storage units (2, 2B) among the plurality of power storage units (2, 2B), only some of power storage units (2, 2B) in which the overcurrent has flowed can be electrically separated from the pair of connection points (P1, P2). That is, some of power storage units (2, 2B) in which the overcurrent has flowed are electrically disconnected from the pair of connection points (P1, P2) by corresponding disconnection units (3, 3A, 3B). Thereby, a problem, occurring when an overcurrent continues to flow, is less likely to occur. As a result, power supply device (100) has an advantage that even if an abnormality has occurred in some of power storage units (2, 2B), power storage units (2, 2B) can be protected.

Moving body (200) according to an eighth aspect includes power storage device (1, 1A, 1B) according to any one of the first to sixth aspects and main body (201) of moving body (200) configured to utilize an output of power storage device (1, 1A, 1B).

According to this aspect, for example, when an overcurrent flows in only some of power storage units (2, 2B) among the plurality of power storage units (2, 2B), only some of power storage units (2, 2B) in which the overcurrent has flowed can be electrically separated from the pair of connection points (P1, P2). That is, some of power storage units (2, 2B) in which the overcurrent has flowed are electrically disconnected from the pair of connection points (P1, P2) by corresponding disconnection units (3, 3A, 3B). Thereby, a problem, occurring when an overcurrent continues to flow, is less likely to occur. As a result, moving body (200) has an advantage that even if an abnormality has occurred in some of power storage units (2, 2B), power storage units (2, 2B) can be protected.

A capacitor according to a ninth aspect includes an electrolyte. The capacitor is one of a plurality of power storage units (2, 2B) included in power storage device (1, 1A, 1B) according to any one of the first to sixth aspects.

According to this aspect, for example, when an overcurrent flows in only some of power storage units (2, 2B) among the plurality of power storage units (2, 2B), only some of power storage units (2, 2B) in which the overcurrent has flowed can be electrically separated from the pair of connection points (P1, P2). That is, some of power storage units (2, 2B) in which the overcurrent has flowed are electrically disconnected from the pair of connection points (P1, P2) by corresponding disconnection units (3, 3A, 3B). Thereby, a problem, occurring when an overcurrent continues to flow, is less likely to occur. As a result, the capacitor has an advantage that even if an abnormality has occurred in some of power storage units (2, 2B), power storage units (2, 2B) can be protected.

A method for protecting power storage device (1, 1A, 1B) according to a tenth aspect is a method for protecting power storage device (1, 1A, 1B). Power storage device (1, 1A, 1B) includes a plurality of power storage units (2, 2B) electrically connected in parallel between the pair of connection points (P1, P2). The protection method includes a step of electrically disconnecting between at least one of the plurality of power storage units (2, 2B) and at least one of the pair of connection points (P1, P2) in accordance with flowing of a current at a value more than or equal to a predetermined value in the at least one of the plurality of power storage units (2, 2B).

According to this aspect, for example, when an overcurrent flows in only some of power storage units (2, 2B) among the plurality of power storage units (2, 2B), only some of power storage units (2, 2B) in which the overcurrent has flowed can be electrically separated from the pair of connection points (P1, P2). That is, some of power storage units (2, 2B) in which an overcurrent has flowed are electrically disconnected from the pair of connection points (P1, P2) in disconnection processing. Thereby, a problem, occurring when an overcurrent continues to flow, is less likely to occur. As a result, the method for protecting power storage device (1, 1A, 1B) has an advantage that even if an abnormality has occurred in some of power storage units (2, 2B), power storage units (2, 2B) can be protected.

Various configurations (including the modification examples) of power storage devices (1, 1A, 1B) according to the first exemplary embodiment, the second exemplary embodiment, and the third exemplary embodiment can be embodied by the method for protecting a power storage device, without being limited to the above aspects.

The configurations according to the second to sixth aspects are not essential configurations for power storage device (1, 1A, 1B), and can be omitted as appropriate.

What is claimed is:

1. A power storage device comprising:
   a plurality of power storage units electrically connected in parallel between a pair of connection points;
   a plurality of disconnection units each connecting to a corresponding power storage unit in the plurality of power storage units, wherein:
   each of the plurality of disconnection units is configured to electrically disconnect between the corresponding power storage unit and at least one of the pair of connection points in accordance with flowing of a current at a value more than or equal to a predetermined value in the corresponding power storage unit, and
   the predetermined value is 3 times or more and 20 times or less of a rated current of the corresponding power storage unit.

2. The power storage device according to claim 1, wherein at least one of the plurality of disconnection units is a fuse.

3. The power storage device according to claim 1, further comprising a substrate on which the plurality of power storage units are mounted, wherein at least one of the plurality of disconnection units is a conductor layer disposed on the substrate.

4. The power storage device according to claim 1, wherein:
- at least one of the plurality of disconnection units is integrated with the corresponding power storage unit,
- the corresponding power storage unit includes a pair of lead terminals, and
- a part of one of the pair of lead terminals is formed in a narrow line shape to be the at least one of the plurality of disconnection units.

5. The power storage device according to claim 1, wherein the flowing of a current at a value more than or equal to the predetermined value in the corresponding power storage unit is caused by a current flowing from a power storage unit other than the corresponding power storage unit among the plurality of power storage units.

6. The power storage device according to claim 1, wherein at least one of the plurality of power storage units is an electrolytic capacitor including a liquid electrolyte.

7. A power supply device comprising:
- the power storage device according to claim 1; and
- a power supply circuit.

8. A moving body comprising:
- the power storage device according to claim 1; and
- a main body of the moving body configured to utilize an output of the power storage device.

9. A capacitor comprising an electrolyte, wherein:
- the capacitor is one of a plurality of power storage units included in a power storage device,
- the power storage device further includes a plurality of disconnection units each connecting to a corresponding power storage unit in the plurality of power storage units,
- the plurality of power storage units are electrically connected in parallel between a pair of connection points,
- each of the plurality of disconnection units is configured to electrically disconnect between the corresponding power storage unit and at least one of the pair of connection points in accordance with flowing of a current at a value more than or equal to a predetermined value in the corresponding power storage unit, and
- the predetermined value is 3 times or more and 20 times or less of a rated current of the corresponding power storage unit.

10. A method for protecting a power storage device,
- the power storage device including a plurality of power storage units electrically connected in parallel between a pair of connection points,
- the method comprising a step of electrically disconnecting between at least one of the plurality of power storage units and at least one of the pair of connection points in accordance with flowing of a current at a value more than or equal to a predetermined value in the at least one of the plurality of power storage units;
- wherein the predetermined value is 3 times or more and 20 times or less of a rated current of the corresponding power storage unit.

* * * * *